United States Patent [19]

Sekhar et al.

[11] Patent Number: 5,364,513
[45] Date of Patent: Nov. 15, 1994

[54] ELECTROCHEMICAL CELL COMPONENT OR OTHER MATERIAL HAVING OXIDATION PREVENTIVE COATING

[75] Inventors: Jainagesh A. Sekhar, Cincinnati, Ohio; Vittorio de Nora, Nassau, Bahamas

[73] Assignee: Moltech Invent S.A., Luxembourg

[21] Appl. No.: 898,052

[22] Filed: Jun. 12, 1992

[51] Int. Cl.$^5$ .......................... C25C 3/08; C25C 3/16; B05D 5/12; B05D 1/36

[52] U.S. Cl. .................. 204/243 R; 204/244; 204/279; 204/290 R; 204/294; 427/77; 427/113; 427/126.2; 427/126.3; 427/126.4; 427/190; 427/192; 427/191; 427/201; 427/202; 427/203; 427/204; 427/205; 501/120; 501/127

[58] Field of Search ....... 204/290 R, 294, 243 R-247, 204/279; 501/120, 127; 427/77, 113, 126.2, 126.3, 129.4, 190-192, 201, 202, 203, 204, 205

[56] References Cited

U.S. PATENT DOCUMENTS

| | | | |
|---|---|---|---|
| 2,859,138 | 11/1958 | Blanchard | 117/169 |
| 2,866,724 | 12/1958 | Alexander | 427/113 X |
| 3,249,460 | 5/1966 | Gerry | 427/376.2 |
| 3,348,929 | 10/1967 | Valtschen et al. | 427/113 |
| 3,404,031 | 10/1968 | Clayton et al. | 252/507 X |
| 3,852,107 | 12/1974 | Lorkin et al. | 427/113 X |
| 3,859,198 | 1/1975 | Emblem et al. | 204/294 X |
| 3,939,028 | 2/1976 | Schiffarth et al. | 427/376.2 |
| 3,964,924 | 6/1976 | Kurzeja | 252/506 X |
| 4,418,097 | 11/1983 | Misra | 427/113 |
| 4,487,804 | 12/1984 | Reven | 428/408 |
| 4,535,035 | 8/1985 | Smialek et al. | 428/698 |
| 4,559,270 | 12/1985 | Sara | 428/408 |
| 4,567,103 | 1/1986 | Sara | 428/408 |
| 4,585,675 | 4/1986 | Shuford | 427/376.2 |
| 4,650,552 | 3/1987 | de Nova et al. | 501/127 X |
| 4,711,666 | 12/1987 | Chapman et al. | 252/508 |
| 4,726,995 | 2/1988 | Chiu | 427/113 |
| 4,769,074 | 9/1988 | Holcombe, Jr. et al. | 252/508 X |
| 4,921,731 | 5/1990 | Clark et al. | 427/314 |
| 4,983,423 | 1/1991 | Goldsmith | 427/376.2 X |
| 5,169,233 | 11/1992 | Sonuparlak et al. | 501/120 X |
| 5,194,330 | 3/1993 | Van den bulcke et al. | 428/698 X |

FOREIGN PATENT DOCUMENTS

| | | |
|---|---|---|
| 0102186 | 7/1983 | European Pat. Off. . |
| 0134769 | 7/1984 | European Pat. Off. . |

OTHER PUBLICATIONS

Chemical Abstracts, vol. 114, No. 8, Feb. 25, 1991, abstract no. 67830 m.

*Primary Examiner*—Donald R. Valentine
*Attorney, Agent, or Firm*—Frost & Jacobs

[57] ABSTRACT

A body of carbonaceous or other material for use in corrosive environments such as oxidizing media or gaseous or liquid corrosive agents at elevated temperatures, in particular in molten salts such as cryolite, is coated with a protective surface coating which improves the resistance of the body to oxidation or corrosion and which may also enhance the bodies electrical conductivity and/or its electrochemical activity. The protective coating is applied in one or more layers from a colloidal slurry containing reactant or non-reactant substances, or a mixture of reactant and non-reactant substances, in particular mixtures containing silicon carbide and molybdenum silicide or silicon carbide and silicon nitride, which when the body is heated to a sufficient elevated temperature reaction sinter as a result of micropyretic reaction and/or sinter without reaction to form the protective coating.

47 Claims, No Drawings

ELECTROCHEMICAL CELL COMPONENT OR OTHER MATERIAL HAVING OXIDATION PREVENTIVE COATING

FIELD OF THE INVENTION

The invention relates to bodies of materials such as, for example, carbonaceous materials, for use in corrosive environments such as oxidising media or gaseous or liquid corrosive agents at elevated temperatures, coated with a protective surface coating which improves the resistance of the bodies to oxidation or corrosion and which may also enhance the electrical conductivity and/or electrochemical activity of the body.

BACKGROUND OF THE INVENTION

Carbonaceous materials are important engineering materials used in diverse applications such as aircraft bodies, electrodes, heating elements, structural materials, rocket nozzles, metallurgical crucibles, pump shafts, furnace fixtures, sintering trays, inductions furnace susceptors, continuous casting dies, ingot molds, extrusion canisters and dies, heat exchangers, anodes, high temperature insulation (porous graphite), gas diffusers, aerospace structural materials, bearings, substrates in electronics industry, brazing and joining fixtures, diamond wheel molds, nozzles, glass molds etc. Although carbonaceous materials have properties which make them useful for the applications mentioned above, the resistance to oxidation is one property which has limited the use of these materials. Much effort is therefore underway to improve the resistance to oxidation of such materials.

Traditional methods of preventing oxidation of carbonaceous materials have involved the deposition of adherent and highly continuous layers of materials such as silicon carbide or metals such as aluminum. The deposit of such materials has normally been carried out by techniques such as vapor deposition (both PVD and CVD) or by electrochemical methods. Vapor deposition is an extremely slow and costly process and additionally may not be carried out for large parts such as electrodes. It is also known to plasma spray alumina/aluminium onto the sides of carbon anodes used as anodes for aluminium electrowinning, but this coating method is expensive. Other techniques such as electrochemical methods are limited in the type of materials that may be applied as coatings and size limitations again may be present. Sol-gel techniques are known for the application of coatings. However, it is well known that these techniques are not adequate for oxidation protection, because they produce extremely thin films, usually of the order of 1 micrometer thick, that are most often porous and have a tendency to delaminate especially under conditions of thermal expansion mismatch with the substrate.

Therefore, there is a need for developing a cost effective versatile method for coating carbonaceous materials with an adherent coating that will effectively prevent oxidation and the loss of the carbonaceous substrate because of rapid or slow burning.

SUMMARY OF THE INVENTION

According to the invention, a protective coating on a body of carbonaceous or other material which improves the resistance of the body to oxidation, and which may also enhance the bodies electrical conductivity and/or its electrochemical activity is applied from a colloidal slurry containing particulate reactant or non-reactant substances, or a mixture of particulate reactant and non-reactant substances, which when the body is heated to a sufficient elevated temperature form the protective coating by reaction sintering and/or by sintering without reaction.

The coatings of the invention are "thick" coatings, of the order of tens of micrometers thick, and contain refractory particulate materials which adjust to the thermal expansion mismatch and, in most embodiments, after sintering or oxidation during use, are able to provide a continuous thick silica layer for oxidation prevention.

The invention is particularly advantageous when the body is made of carbonaceous material, for instance petroleum coke, metallurgical coke, anthracite, graphite, amorphous carbon, fulerene such as fulerene $C_{60}$ or $C_{70}$ or of a related family, low density carbon or mixtures thereof. The coatings are particularly adherent on carbon substrates because the high surface activity bonds the particles to the carbon.

It is advantageous for bodies of low-density carbon to be protected by the coating of the invention, for example if the component is exposed to oxidising gas released in operation of an electrolytic cell, or also when the substrate is part of a cell bottom. Low density carbon embraces various types of relatively inexpensive forms of carbon which are relatively porous and very conductive, but hitherto could not be used successfully in the environment of aluminium production cells on account of the fact that they were subject to excessive corrosion or oxidation. Now it is possible by coating these low density carbons according to the invention, to make use of them in these cells instead of the more expensive high density anthracite and graphite, taking advantage of their excellent conductivity and low cost.

The invention also concerns coated bodies with substrates of a metal, alloy, intermetallic compound or refractory material, to which the protective coating is applied.

Two types of coatings have been developed and are described in this application. One will be called the micropyretic type and the other the non-micropyretic type. Micropyretic coatings contain combustible materials which provide heat during combustion and also add desired constituents to the coating after combustion of the coating. The non-micropyretic type does not contain any combustible. Mixtures of micropyretic and non-micropyretic coatings are also possible. Both coatings involve the application of a colloidal slurry which is applied to the substrate by painting, spraying, dipping or pouring onto the substrate. When several layers of such coatings are applied, it is possible that some may contain micropyretic constituents and some may not.

Thus, the applied colloidal slurry may contain micropyretic particulate reactant substances which undergo a sustained micropyretic reaction to produce for example refractory borides, silicides, nitrides, carbides, phosphides, oxides, aluminides, metal alloys, intermetallics, and mixtures thereof, of titanium, zirconium, hafnium, vanadium, silicon, niobium, tantalum, nickel, molybdenum and iron, the micropyretic reactant substances being finely divided particulates including elements making up the refractory material produced.

Such micropyretic reactant substances may for instance comprise particles, fibers or foils of Ni, Al, Ti, B, Si, Nb, C, $Cr_2O_3$, Zr, Ta, $TiO_2$, $B_2O_3$, Fe, Mo or combinations thereof.

It is essential to use colloids and mixtures of colloids for application of the coatings. Three types of colloidal processing are possible. The first involves the gelation of certain polysaccharide solutions. This, however, is relatively unimportant to this invention. The other two which involve colloids and metal organic compounds are relevant to this invention. These two involve the mixing of materials in a very fine scale. Colloids are defined as comprising a dispersed phase with at least one dimension between 0.5 nm (nanometer) and about 10 micrometers in a dispersion medium which in our case is a liquid. The magnitude of this dimension distinguishes colloids from bulk systems in the following way: (a) an extremely large surface area and (b) a significant percentage of molecules reside in the surface of colloidal systems. Up to 40% of molecules may reside on the surface. The colloidal systems which are important to this invention are both the thermodynamically stable lyophylic type (which include macromolecular systems such as polymers) and the kinetically stable lyophobic type (those that contain particles).

Insoluble oxides in aqueous suspension develop surface electric charges by surface hydroxylation followed by dissociation of surface hydroxyl groups. Typical equations could be:

$$M(OH) \text{ surface} + H_2O \rightleftharpoons MO^- \text{surface} + H_3O^+$$

$$M(OH) \text{ surface} + H_2O \rightleftharpoons M(OH_2)^+ \text{surface} + OH^-$$

where M represents a metal or a complex cation.

Such surface charges and the London and Van der Waals forces keep the particles from agglomerating. An adsorbed layer of material, polymer or surface active agent, modifies the interaction of particles in several ways. In the mixing process described below we introduce new materials and other agents into the colloids.

Colloids may form through cation hydrolysis. Many metal ions are subject to hydrolysis because of high electronic charge or charge density. Initial products of hydrolysis can condense and polymerize to form polyvalent metal or polynuclear ions, which are themselves colloidal. Charge and pH determine the ligands for central cations and the anion/cation ratio controls the degree of polymerization and stability of the suspension. The pH could vary from 0-14. A wide range of polynuclear cationic hydrolysis products may exist with charge from 2+ to 6+. Polynuclear anionic hydrolysis products could also have a wide range of charges.

The formation of colloids involves a starting material for example a reagent grade metal sale which is converted in a chemical process to a dispersible oxide which forms the colloidal solution on addition of dilute acid or water. Removal of water (drying) and or removal of the anions from the colloidal solution produces a gel Like product. In the method of the invention for oxidation resistant coatings, the colloid thus acts as a binder to the other additives and also densifies the product formed. The calcination process in air yields an oxide product after decomposition of salts whereas carbon, silicon, boron etc. may be added to the colloid to yield a non oxide ceramic in the coating. The colloidal solutions may also be blended.

The colloidal carrier—usually colloidal alumina, colloidal ceria, colloidal silica, colloidal yttria or colloidal monoaluminium phosphate and usually in an aqueous medium—has been found to assist in moderating the micropyretic reaction and to considerably improve the properties of the coating whether produced by reaction sintering or non-reactive sintering. It is however not necessary for all of the applied layers of the slurry to have a colloidal carrier. Excellent results have been obtained using some slurries with a colloidal carrier and others with an organic solvent. Combinations of a colloidal carrier in aqueous medium and an organic solvent have also worked well.

In the case of micropyretic coatings an additional step after the drying of the applied slurry on the coating will be the firing (combustion) of the constituents of the slurry by direct flame, concentrated sunlight, plasma, laser, electron beam or by traditional methods such as passing a current through the conductive substrate or placing the coated article inside a furnace at a predetermined temperature or by heating the coating by an induction method or by radiant heating.

The applied colloidal slurry contains particulate substances which sinter above a given temperature, in particular reactant and/or non-reactant substances like silicon carbide that reaction sinter and/or sinter without reaction above 900° C. The coating may be pre-formed prior to use, in which case the reactant and/or non-reactant substances have been reaction sintered and/or sintered without reaction to provide an adherent coating on the body prior to use. Alternatively, the micropyretic reaction sintering or the non-reactive sintering may take place only when the body coated with the coating components is used at high temperature.

When use of a silicon-carbide-containing coating is contemplated at temperatures below 900° C. then normally micropyretic coatings are preferred; when use is contemplated at above 900° C. then non-micropyretic coatings are also acceptable. This is because the coatings become effective after they sinter. Above 900° C., sintering may occur during exposure to the service conditions at the high temperature. Below 900° C. the micropyretic reaction and the combustion initiation process will provide the required heat for the sintering operation. Nevertheless, it remains possible to sinter non-micropyretic coatings above 900° C. and then use them below 900° C.

In-situ repair of coatings during use is also contemplated by both types of coatings.

The constituents of the slurries are:
(a) A carrier, chosen from colloidal liquids which could be colloidal alumina, colloidal ceria, colloidal yttria, colloidal silica, colloidal zirconia or mono-aluminum phosphate or colloidal cerium acetate or mixtures thereof.
(b) A powder additive containing carbides, silicides, borides, nitrides, oxides, nitrides, carbonitrides, oxynitrides, boric acid and its salts, and combinations of these. When choosing combinations of powder additives the particle size selection is of importance. It is preferable to choose particle size below 100 microns and, when employing combinations of powder additives, to choose particle sizes which are varied such that the packing of particles is optimized. For example when choosing a composition containing mostly SiC and some $MoSi_2$ it is preferable to choose the particle size of the $MoSi_2$ much smaller (at least three times smaller) than the SiC. Generally, the ratio of the particle sizes will be in the range from 2:1 to 5:1, preferably about 3:1, for instance with large particles in the range 15 to 30 micrometers and small particles in the range 5 to 10 micrometers.

(c) Metallic particles such as for example Ni, Pt, Al, Cr or intermetallic particles such as for example NiAl, NiAl$_3$, CrSi, CrB etc. or combinations thereof, in which case the particle sizes will be varied no achieve optimum packing, as for powder additives.

(d) Micropyretic agents. These agents are particles, fibers or foils of materials such as Ni, Al, Ti, B, Si, Nb, C, Cr$_2$O$_3$, Zr, Ta, TiO$_2$, B$_2$O$_3$, Fe, Mo or combinations which may react to yield heat as well as yielding clean and nascent products from the combustion. Typical reactions could be for example Cr$_2$O$_3$+2Al+2B which reacts spontaneously to give CrB$_2$ and Al$_2$O$_3$ with a large release of heat. The adiabatic temperature of such a micropyretic reaction is 6500° K. Tables I, II and III give a partial listing of examples of micropyretic reactions and products and the amount of heat released in each reaction. ΔH (KJ/mole) is the enthalpy release for the reaction and $T_{ad}$ K is the adiabatic temperature (°K.) which is expected to be reached in such reactions.

TABLE I

| FORMATION OF REFRACTORY COMPOUNDS | | |
|---|---|---|
| REACTION | ΔH(KJ/mole) | Tad K |
| Ti + 2B = TiB$_2$ | −293.00 | 3190 |
| Zr + 2B = ZrB$_2$ | −263.75 | 3310 |
| Nb + 2B = NbB$_2$ | −207.74 | 2400 |
| Ti + B = TiB | −158.84 | 3350 |
| Hf + 2B = HfB$_2$ | −310.15 | 3520 |
| Ta + 2B = TaB$_2$ | −193.53 | 3370 |
| Ti + C = TiC | −232.00 | 3210 |

TABLE II

| FORMATION OF INTERMETALLICS | | |
|---|---|---|
| REACTION | ΔH(KJ/mole) | Tad K |
| Ti + Ni = TiNi | −66.5 | 1773 |
| Ti + Pd = TiPd | −103.4 | 1873 |
| Ni + Al = NiAl | −118.4 | 1923 |
| Ti + Al = TiAl | −72.8 | 1734 |
| Ti + Fe = TiFe | −40.6 | 1423 |

TABLE III

| FORMATION OF COMPOSITES | | |
|---|---|---|
| REACTION | ΔH(KJ/mole) | Tad K |
| Fe$_2$O$_3$ + 2Al = Al$_2$O$_3$ + 2Fe | −836.00 | 3753 |
| Cr$_2$O$_3$ + 2Al = Al$_2$O$_3$ + 2Cr | −530.00 | 2460 |
| 2Cr$_2$O$_3$ + 6Al + 6C = 2Cr$_2$C$_3$ + 3Al$_2$O$_3$ | | 6500 |
| 0.86Ti + 1.72B + 1.48Al = 0.86TiB$_2$ + 1.48Al | −293.00 | 1450 |
| Ti + C + 0.68Ni = TiC + 0.68Ni | −232.00 | 1370 |
| Zr + 2B + Cu = ZrB$_2$ + Cu | −263.75 | 1100 |

(e) Metal organic compounds principally metal alkoxides of the general formula M(OR)$_z$ where M is a metal or complex cation made up of two or more elements, R is an alkyl chain and z is a number usually in the range 1 to 12, or alternatively described as solutions in which molecules in which organic groups are bound to a metal atom through oxygen. Examples are silicon tetraisomyloxide, aluminum butoxide, aluminum isopropoxide, tetraethyl orthosilicates, etc. Formates, acetates and acetylacetonates are also considered in this category.

(f) Pyrolizable chlorosilanes, polycarbosilanes, polysilazanes and other organosilicon polymers as binders which pyrolize to useful products for oxidation prevention. Such compounds are expected to participate in the micropyretic reaction in a beneficial but complex manner to increase the yield of useful product with a morphology and size which assists in making the coating more adherent and tight.

(g) Buffer solutions to modify the pH of the slurry. These are standard laboratory grade alkalines or acids.

(h) Binding agents such as methyl cellulose, clays like kaolinite, polyvinyl butyral, fused silica and activators, etc.

Considering the above defined constituent groups (a) to (h), the slurries used in the invention are made up of at least one of the additives from groups (b), (c) and/or (d) in a colloidal carrier from group (a), optionally together with one or more components from groups (e) to (h). Some materials may be present under more than one heading. For instance silica or alumina in colloidal form can be included in the carrier, and in powder form as additive. Particulate nickel and aluminium can be present as a micropyretic reactant, but in excess of the stoichiometric amount, whereby the excess forms a particulate additive. It is also possible for the powder additive to be the same as the reaction product of the micropyretic reaction.

The non-reactant substances may comprise antioxidant or oxidation prevention materials such as boric acid and its salts, and fluorides; bonding enhancing materials such as methyl-cellulose, particulate alumina or urea; metallic, intermetallic, semi-metallic, polymeric, refractory and/or ceramic materials such as borides, carbides, nitrides, silicides, oxides, oxynitrides and mixtures thereof; pyrolizable chlorosilanes, polycarbosilanes, polysilanes and other organometal polymers which pyrolize to useful products for oxidation prevention or enhancing bonding, or their pyrolized products: thermosetting resins; thermoplastic resins; and mixtures thereof.

Examples of thermosetting resins are epoxides, phenolic resins and polyimides. Examples of thermoplastic resins are polycarbonates, e.g. Lexan TM, polyphenylene sulfides, polyether ether ketones, polysulfones, e.g. Udel TM, polyetherimides and polyethersulfones.

The coating advantageously contains at least one silicon-containing compound, which may be included as a reactant and/or as a non-reactant, advantageously in a substantial amount, usually accounting for 30 wt % or more of the coating, advantageously 50 wt % or more. Silicon compounds when reacted or sintered form on the body a relatively impervious silica skin, providing excellent resistance against oxidation and corrosion. Formation of such a silicous skin can be enhanced by including colloidal silica in the carrier.

The applied coating for instance contains an least one carbide, nitride, boride or oxide of silicon or combinations thereof, in combination with at least one silicide of titanium, zirconium, hafnium, vanadium, niobium, tantalum, nickel, molybdenum, chromium and iron, or a combination of at least two carbides, nitrides, borides or oxides of silicon. One particularity advantageous combination includes silicon carbide with molybdenum silicide. Another includes silicon carbide with silicon nitride. These silicon-based combinations can be used alone or in combination with other silicon or non-silicon non-reactants or with micropyretic reactants, and particularly with colloidal silica in the carrier. When such coatings are sintered before use in an oxidising atmosphere, or when such coatings are used in an oxidsing atmosphere, the coatings are converted to produce a relatively impervious silica skin.

The invention is useful for protecting the various engineering materials made of carbon listed at the outset. A main application of the invention is however for the protection of components of electrochemical cells for molten salt electrolysis which components in use are exposed to a corrosive atmosphere, or to a molten salt electrolyte, such as cryolite, and/or to a product of electrolyis in the cell. Such components are thus coated with a protective surface coating which improves the resistance of the components to oxidation or corrosion and which may also enhance the electrical conductivity and/or electrochemical activity. The protective coating is applied from a colloidal slurry containing particulate reactant or non-reactant substances, or a mixture of particulate reactant and non-reactant substances, which when the component is heated to a sufficient elevated temperature, prior to or upon insertion in the cell, form the protective coating by reaction sintering and/or by sintering without reaction.

Such components may have a carhonaceous substrate, or a substrate of a metal, alloy, intermetallic compound or refractory material, to which the protective coating is applied. The component may be a cathode or a cathode current feeder, an anode or an anode current feeder, e.g. for a Hall-Héroult cell, or a bipolar electrode for new cell designs.

The invention is particularly applicable to components which are exposed to corrosive or oxidising gas released in operation of the cell or present in the cell operating conditions, the component comprising a substrate of carbonaceous material (particularly low-density carbon), refractory material or metal alloy that is subject to attack by the corrosive or oxidising gas and is protected from corrosion or oxidation by the protective surface coating.

The invention also concerns a method of improving the resistance to oxidation or corrosion of a body of material for use in corrosive environments such as oxidising media or gaseous or liquid agents at elevated temperatures, the body being in particular a component of an electrochemical cell for molten salt electrolysis which component in use is exposed to a corrosive atmosphere, or to a molten salt electrolyte and/or to a product of electrolyis in the cell. This method comprises applying to the body a protective coating from a colloidal slurry containing reactant or non-reactant substances, or a mixture of reactant and non-reactant substances, followed by heating the body prior to or during use to a sufficient temperature to cause the reactant and/or non-reactant substances to reaction sinter and/or to sinter without reaction to form an adherent protective coating.

The method of application of the slurry involves painting (by brush or roller), dipping, spraying, or pouring the liquid onto the substrate and allowing for drying before another layer is added. The coating need not entirely dry before the application of the next layer. However if one or more layers with micropyretic constituents are present, then it is preferable to dry completely prior to firing. Layers may be added to already fired coatings either for repair or for additional build up. Even when micropyretic constituents are absent, it is preferred to heat the coating with a suitable heat source such as a torch (butane or oxyacetylene), a laser, a furnace, etc., so as to improve densification of the coating. Heating takes place preferably in air but could be in other oxidising atmospheres or in inert or reducing atmospheres.

The substrate may be treated by sand blasting or pickled with acids or fluxes such as cryolite or other combinations of fluorides and chlorides prior to the application of the coating. Similarly the substrate may be cleaned with an organic solvent such as acetone to remove oily products and other debris prior to the application of the coating. These treatments will enhance the bonding of the coatings to the substrate.

After coating the substrate applied by dipping, painting, spraying or combinations of such techniques in single or multi-layer coatings and drying, a final coat of one or more of the liquids listed in (a)-(e) may be applied lightly prior to use.

More generally, after fabrication and before use, the body can be painted, sprayed, dipped or infiltrated with reagents and precursors, gels and/or colloids.

Examples of some non-micropyretic slurries and some micropyretic slurries are given in Table IV and Table V respectively.

TABLE IV

EXAMPLES OF NON-MICROPYRETIC SLURRIES

| Sample | Composition Powder (w %)/Particle Size | | | | | Carrier, vol % | Powder/Carrier g/ml |
|---|---|---|---|---|---|---|---|
| | −200 mesh | <10 microns | −325 mesh | −325 mesh | −325 mesh | | |
| 1 | SiC 97.5% | $Si_3N_4$ 2.5% | — | — | — | Coll-Silica 50% Coll-Alumina 50% | 10/6 |
| 2 | SiC 90% | $Si_3N_4$ 10% | — | — | — | Coll-Alumina 100% | 10/6 |
| 3 | SiC 90% | $Si_3N_4$ 10% | — | — | — | Coll-Silica 100% | 10/6 |
| 4 | SiC 90% | — | $Y_2O_3$ 10% | — | — | Coll-Alumina 100% | 10/6 |
| 5 | SiC 90% | — | $Y_2O_3$ 10% | — | — | Coll-Silica 100% | 10/6 |
| 6 | SiC 92.5% | $Si_3N_4$ 2.5% | $Y_2O_3$ 5% | — | — | Coll-Silica 50% Coll-Alumina 50% | 10/6 |
| 7 | SiC 90% | $Si_3N_4$ 10% | — | — | — | Coll-Yttria 100% | 10/5 |
| 8 | SiC 90% | $Si_3N_4$ 10% | — | — | — | Coll-Ceria 100% | 10/5 |
| 9 | SiC 90% | $Si_3N_4$ 5% | $Y_2O_3$ 2.5% | $Al_2O_3$ 2.5% | — | Coll-Silica 100% | 10/5 |
| 10 | SiC 85% | $Si_3N_4$ 5% | $Y_2O_3$ 2.5% | $Al_2O_3$ 2.5% | $TiB_2$ 5% | Coll-Silica 100% | 10/5 |
| 11 | SiC 85% | $Si_3N_4$ 5% | $Y_2O_3$ 2.5% | $SiO_2$ 2.5% | $TiB_2$ 5% | Coll-Alumina 100% | 10/5 |
| 12 | SiC 90% | $MoSi_2$ 5% | $Y_2O_3$ 2.5% | $Al_2O_3$ 2.5% | — | Coll-Silica 100% | 10/5 |
| 13 | SiC 85% | $MoSi_2$ 5% | $Y_2O_3$ 2.5% | $Al_2O_3$ 2.5% | $TiB_2$ 5% | Coll-Silica 100% | 10/5 |
| 14 | SiC 85% | $MoSi_2$ 5% | $Y_2O_3$ 2.5% | $SiO_2$ 2.5% | $TiB_2$ 5% | Coll-Alumina 100% | 10/5 |
| 15 | SiC 80% | $MoSi_2$ 10% | $Y_2O_3$ 10% | — | — | Coll-Silica 100% | 10/5 |

TABLE IV-continued

EXAMPLES OF NON-MICROPYRETIC SLURRIES

| Sample | Composition Powder (w %)/Particle Size | | | | | Carrier, vol % | Powder/Carrier g/ml |
| --- | --- | --- | --- | --- | --- | --- | --- |
| | −200 mesh | <10 microns | −325 mesh | −325 mesh | −325 mesh | | |
| 16 | SiC 70% | MoSi$_2$ 20% | Y$_2$O$_3$ 2.5% | Al$_2$O$_3$ 2.5% | TiB$_2$ 5% | Coll-Silica 100% | 10/5 |

TABLE V

EXAMPLES OF MICROPYRETIC SLURRIES

| Sample | Composition Powder (w %)/Particle Size | | | | | Carrier, vol % | Powder/Carrier g/ml |
| --- | --- | --- | --- | --- | --- | --- | --- |
| | −200 mesh | <10 microns | −325 mesh | −325 mesh | −325 mesh | | |
| 1 | SiC 60% | Si$_3$N$_4$ 10% | Ti 17% | B 8% | TiB$_2$ 5% | Coll-Silica 50% Coll-Alumina 50% | 10/6 |
| 2 | SiC 50% | Si$_3$N$_4$ 8% | Ti 25% | B 10% | TiB$_2$ 7% | Coll-Alumina 100% | 10/6 |
| 3 | SiC 50% | Si$_3$N$_4$ 7% | TiO$_2$ 25% | B$_2$O$_3$ 15% | Al 3% | Coll-Silica 100% | 10/6 |
| 4 | SiC 50% | TiB$_2$ 10% | Y$_2$O$_3$ 8% | Ni 22% | Al 10% | Coll-Ceria Acetate 100% | 10/6 |
| 5 | SiC 50% | ZrB$_2$ 5% | Y$_2$O$_3$ 2% | Ti 20% | Ni 23% | Coll-Silica 100% | 10/6 |
| 6 | SiC 72.5% | Si$_3$N$_4$ 2.5% | Y$_2$O$_3$ 5% | Ti 15% | Si 5% | Coll-Silica 50%/ Coll-Alumina 50% | 10/6 |
| 7 | SiC 80% | Si$_3$N$_4$ 5% | Cr$_2$O$_3$ 10% | Al 3% | C 2% | Coll-Yttria 100% | 10/5 |
| 8 | SiC 50% | Si$_3$N$_4$ 10% | Ti 28% | C 7% | BaO 5% | Coll-Ceria Acetate 100% | 10/5 |
| 9 | SiC 50% | Si$_3$N$_4$ 5% | Ti 26% | Al$_2$O$_3$ 3% | Al 16% | Polycarbosilane 20% Coll-Silica 80% | 10/5 |
| 10 | SiC 40% | Si$_3$N$_4$ 5% | Y$_2$O$_3$ 5% | Ti 37% | Si 13% | Coll-Silica 100% | 10/5 |
| 11 | SiC 45% | Si$_3$N$_4$ 7.5% | Ti 30% | SiO$_2$ 2.5% | B 15% | Coll-Alumina 100% | 10/5 |
| 12 | SiC 90% | Zr 4% | Y$_2$O$_3$ 2.5% | Al$_2$O$_3$ 2.5% | B 1% | Mono-Al-Phosphate 100% | 10/5 |
| 13 | SiC 85% | MoSi$_2$ 5% | Y$_2$O$_3$ 2.5% | Al$_2$O$_3$ 2.5% | TiB$_2$ 5% | Coll-Silica 100% | 10/5 |
| 14 | SiC 85% | MoSi$_2$ 5% | Y$_2$O$_3$ 2.5% | SiO$_2$ 2.5% | TiB$_2$ 5% | Coll-Alumina 100% | 10/5 |
| 15 | SiC 80% | MoSi$_2$ 5% | Y$_2$O$_3$ 10% | Ti 8% | C 2% | Tetraisomyloxide 20% Coll-Silica 80% | 10/5 |
| 16 | SiC 68% | MoSi$_2$ 20% | Cr$_2$O$_3$ 2.5% | Al 7% | C 2.5% | Coll-Silica 100% | 10/5 |

The invention will be further described with reference to the following examples.

EXAMPLE I

A non-micropyretic slurry corresponding to sample 9 of Table IV was applied to a graphite block 4 cm×4 cm×6 cm by painting to build up a layer of approximately 500 micrometers. This block along with an uncoated block were placed in a furnace under air at 1000° C. The uncoated block completely burnt in 24 hours. The coated block showed a weight loss of 5% after an exposure of 27 hours. The coating was noted to remain very stable and adherent. Scanning electron microscope pictures of the coating before and after the exposure show that the coating self densified to protect the carbonaceous substrate.

EXAMPLE II

The test of Example I was repeated but with a micropyretic slurry corresponding to sample 10 of Table V applied as the coating. The coated sample when placed in the furnace was noted to ignite. The weight loss after a 27 hour test was 8%.

EXAMPLE III

A combination of a micropyretic slurry and a non-micropyretic slurry was applied to a graphite substrate in the following manner. A slurry corresponding to sample 13 of Table IV was applied by painting and allowed to build up to 600 microns by applying several coats. Next a micropyretic slurry was applied. This slurry corresponded to sample 11 of Table V except that the SiC powder size was chosen to be 1 micron. This slurry was built up to approximately 500 microns in thickness, thus making the total thickness of the coating to be 1.1 mm. The micropyretic slurry-deposited layer was then successfully fired by an oxyacetylene torch.

EXAMPLE IV

A slurry was made containing 40% by volume of sample 1 of the non-micropyretic slurries in Table IV and 40% by volume of sample 1 of the micropyretic slurries in Table V. To this was added 5 % by volume of cerium acetate (alkoxide), 5% by volume of polysilazanes, 2% buffer solution of pH 10, 3% methyl cellulose and 5% by volume colloidal zirconia. This coating was applied to an anthracite substrate. After drying, the micropyretic slurry-deposited layer was successfully fired by an oxyacetylene torch.

EXAMPLE V

A slurry was made containing 25 gm of TiB$_2$ (particle size 10 microns) and 15 ml colloidal alumina, 10 g titanium (particle size 44 microns) and 5 g boron (particle size 44 microns). This was then coated on a graphite block as in Example I and subjected to the same test conditions. After 27 hours the loss in weight was 5%. The coating had changed in color from black to yellow after 27 hours but remained adherent and protective of the graphite.

EXAMPLE VI

Example I was repeated but a small crack was noted to be present at the corner of the rectangular graphite piece. After a 27 hour test it was noted that a substantial part of the graphite had now burnt by the passage of air through the crack. Another similar test was repeated with a crack, but the sample was removed from the furnace after 1 hour and the crack was healed by the application of the same coating. After 27 hours the sample was noted again to have been protected, thus showing that cracks may be healed if discovered early.

EXAMPLE VII

The slurry of Example IV was mixed with carbon black in the ratio 6 ml of slurry to 1 g of carbon black. This was applied to a graphite block. Further, after drying, the sample was dipped in a mono-aluminum phosphate (MAP) solution and allowed to dry again. The entire assembly was then placed in a furnace at 1000° C. under air. After 27 hours the coating was noted to remain protective of the substrate.

We claim:

1. A body of carbonaceous material for use in corrosive environments such as oxidising media or gaseous or liquid corrosive agents at elevated temperatures, coated with a non-glassy protective surface coating which improves the resistance of the body to oxidation or corrosion and which may also enhance the body's electrical conductivity and/or its electrochemical activity, the protective coating being applied from a colloidal slurry containing particulate reactant or non-reactant, said slurry forming said non-glassy protective coating by reaction sintering and/or sintering without reaction when the body is heated to a sufficiently elevated temperature.

2. A coated body according to claim 1, in which the carbonaceous material is selected from petroleum coke, metallurgical coke, anthracite, graphite, amorphous carbon, fulerene, low density carbon or mixtures thereof.

3. A coated body according to claim 1, in which the applied colloidal slurry contains micropyretic reactant substances which undergo a sustained micropyretic reaction.

4. A coated body according to claim 3, in which the micropyretic reactant substances react to produce refractory borides, silicides, nitrides, carbides phosphides, oxides, aluminides, metal alloys, intermetallics, and mixtures thereof, of titanium zirconium, hafnium, vanadium, silicon, niobium, tantalum nickel, molybdenum and iron, the micropyretic reactant substances comprising finely divided particulates comprising elements making up the refractory material produced.

5. A coated body according to claim 4, in which the micropyretic reactant substances comprise particles, fibers or foils of Ni, Al, Ti, B, Si, Nb, C, $Cr_2O_3$, Zr, Ta, $TiO_2$, $B_2O_3$, Fe, Mo or combinations thereof.

6. A coated body according to claim 1, in which the applied colloidal slurry contains non-reactant substances which sinter above a given temperature.

7. A coated body according to claim 1, in which the reactant and/or non-reactant substances reaction sinter and/or sinter without reaction above 900° C.

8. A coated body according to claim 1, in which the reactant and/or non-reactant substances have been reaction sintered and/or sintered without reaction to provide an adherent coating on the body prior to use.

9. A coated body according to claim 1, in which the non-reactant substances comprise antioxidant or oxidation prevention materials such as boric acid and its salts, and fluorides; bonding enhancing materials such a methyl-cellulose, particulate alumina or urea; metallic, intermetallic, semi-metallic, polymeric, refractory and/or ceramic materials such as borides, carbides, nitrides, silicides, oxides, oxynitrides and mixtures thereof; pyrolizable chlorosilanes, polycarbosilanes, polysilanes and other organometal polymers which pyrolize to useful products for oxidation prevention or enhancing bonding, or their pyrolized products; thermosetting resins; thermoplastic resins; and mixtures thereof.

10. A coated body according to claim 9, containing metallic particles of Ni, Pt, Al, Cr or intermetallic particles selected from NiAl, $NiAl_3$, CrSi, CrB, or combinations thereof.

11. A coated body according to claim 1, in which the non-reactant substances are particulates with a particle size below 100 microns.

12. A coated body according to claim 11, in which different non-reactant particulate substances have different particle sizes to optimize packing of the particles, with particle size ratios in the range from 2:1 to 5:1, preferably about 3:1.

13. A coated body according to claim 1, in which the coating contains at least one silicon-containing compound.

14. A coated body according to claim 13, in which the coating contains at least one carbide, nitride, boride or oxide of silicon or combinations thereof, in combination with at least one silicide of titanium, zirconium, hafnium, vanadium, niobium, tantalum, nickel, molybdenum, chromium and iron, or a combination of at lease two carbides, nitrides, borides or oxides of silicon.

15. A coated body according to claim 14, in which the coating contains silicon carbide and molybdenum silicide or silicon carbide and silicon nitride.

16. A coated body according to claim 1, in which the colloidal slurry comprises at least one of colloidal silica, alumina, yttria, ceria, thoria, zirconia, magnesia, lithia and hydroxides, acetates and formates thereof as well as oxides and hydroxides of other metals, cationic species and mixtures thereof.

17. A coated body according to claim 16, in which the colloidal slurry is derived from colloid precursors and reagents which are solutions of at least one salt such as chlorides, sulfates, nitrates, chlorates, perchlorates or metal organic compounds such as alkoxides, formates, acetates of silicon, aluminium, yttrium, cerium, thorium zirconium, magnesium, lithium and other metals and mixtures thereof.

18. A coated body according to claim 17, in which the colloid precursor or colloid reagent contains a chelating agent such as acetyl acetone or ethylacetoacetate.

19. A coated body according to claim 17, in which the solutions of metal organic compounds, principally metal alkoxides, are of the general formula $M(OR)_z$ where M is a metal or complex cation, R is an alkyl chain and z is a number.

20. The coated body of claim 1, which is a component of an electrochemical cell for molten salt electrolysis which component in use is exposed to a corrosive atmosphere, or to a molten salt electrolyte and/or to a product of electrolysis in the cell, the component comprising a substrate of carbonaceous material coated with a non-glassy protective surface coating which improves the resistance of the component to oxidation or corrosion and which may also enhance the electrical conductivity and/or electrochemical activity, the protective coating being applied from a colloidal slurry containing particulate reactant or nonreactant substance, or a mixture of particulate reactant and non-reactant substances, said slurry forming said non-glassy protective coating by reaction sintering and/or sintering without reaction when the component is heated to a sufficiently elevated temperature.

21. An electrochemical cell component according to claim 20, in which the carbonaceous material is selected from petroleum coke, metallurgical coke, anthracite, graphite, amorphous carbon, fulerene, low density carbon or mixtures thereof.

22. An electrochemical cell component according to claim 20, in which the applied colloidal slurry contains micropyretic reactant substances which undergo a sustained micropyretic reaction.

23. An electrochemical cell component according to claim 22, in which the micropyretic reactant substances react to produce refractory borides, silicides, nitrides, carbides, phosphides, oxides, aluminides, metal alloys, intermetallics, and mixtures thereof, of titanium, zirconium, hafnium, vanadium, silicon, niobium, tantalum, nickel, molybdenum and iron, the micropyretic reactant substances comprising finely divided particulates comprising elements making up the refractory material produced.

24. An electrochemical cell component according to claim 23, in which the micropyretic reactant substances comprise particles, fibers or foils of Ni, Al, Ti, B, Si, Nb, C, $Cr_2O_3$, Zr, Ta, $TiO_2$, $B_2O_3$, Fe, Mo or combinations thereof.

25. An electrochemical cell component according to claim 20, in which the applied colloidal slurry contains non-reactant substances which sinter above a given temperature.

26. An electrochemical cell component according to claim 20, in which the reactant and/or non-reactant substances reaction sinter and/or sinter without reaction above 900° C.

27. An electrochemical cell component according to claim 20, in which the reactant and/or non-reactant substances have been reaction sintered and/or sintered without reaction to provide an adherent coating on the component prior to use.

28. An electrochemical cell component according to claim 20, in which the non-reactant substances comprise antioxidant or oxidation prevention materials such as boric acid and its salts, and fluorides; bonding enhancing materials such as methyl-cellulose, particulate alumina or urea; metallic, intermetallic, semi-metallic, polymeric, refractory and/or ceramic materials such as borides, carbides, nitrides, silicides, oxides, oxynitrides and mixtures thereof; pyrolizable chlorosilanes, polycarbosilanes, polysilanes and other organometal polymers which pyrolize to useful products for oxidation prevention or enhancing bonding, or their pyrolized products; thermosetting resins; thermoplastic resins; and mixtures thereof.

29. An electrochemical cell component according to claim 28, containing metallic particles of Ni, Pt, Al, Cr or intermetallic particles selected from NiAl, $NiAl_3$, CrSi, CrB, or combinations thereof.

30. An electrochemical cell component according to claim 20, in which the non-reactant substances are particulates with a particle size below 100 microns.

31. An electrochemical cell component according to claim 30, in which different non-reactant particulate substances have different particle sizes to optimize packing of the particles, with particle size ratios in the range from 2:1 to 5:1, preferably about 3:1.

32. An electrochemical cell component according to claim 20, in which the coating contains at least one silicon-containing compound.

33. An electrochemical cell component according to claim 32, in which the coating contains at least one carbide, nitride, boride or oxide of silicon or combinations thereof; in combination with at least one silicide of titanium, zirconium, hafnium, vanadium, niobium, tantalum, nickel, molybdenum, chromium and iron, or a combination of at least two carbides, nitrides, borides or oxides of silicon.

34. An electrochemical cell component according to claim 33, in which the coating contains silicon carbide and molybdenum silicide or silicon carbide and silicon nitride.

35. An electrochemical cell component according to claim 20, in which the colloidal slurry comprises at least one of colloidal silica, alumina, yttria, ceria, thoria, zirconia, magnesia, lithia and hydroxides, acetates and formates thereof as well as oxides and hydroxides of other metals, cationic species and mixtures thereof.

36. An electrochemical cell component according to claim 35, in which the colloidal slurry is derived from colloid precursors and reagents which are solutions of at least one salt such as chlorides, sulfates, nitrates, chlorates, perchlorates or metal organic compounds such as alkoxides, formates, acetates of silicon, aluminium, yttrium, cerium, thorium zirconium, magnesium, lithium and other metals and mixtures thereof.

37. An electrochemical cell component according to claim 36, in which the colloid precursor or reagent contains a chelating agent such as acetyl acetone or ethylacetoacetate.

38. An electrochemical cell component according to claim 37, in which the solutions of metal organic compounds, principally metal alkoxides, are of the general formula $M(OR)_z$ where M is a metal or complex cation, R is an alkyl chain and z is a number.

39. An electrochemical cell component according to claim 20, which is a cathode or a cathode current feeder.

40. An electrochemical cell component according to claim 20, which is an anode or an anode current feeder.

41. An electrochemical cell component according to claim 20, which is a bipolar electrode.

42. An electrochemical cell component according to claim 20, wherein the component in operation of the cell is exposed to corrosive or oxidising gas released in operation of the cell or present in the cell operating conditions, said component comprising a substrate of carbonaceous material, that is subject to attack by the corrosive or oxidising gas and being protected from corrosion or oxidation by the protective surface coating.

43. An electrochemical cell component according to claim 42, wherein the component has a substrate of low-density carbon protected by the refractory material.

44. A body of carbonaceous or other material for use in corrosive environments such as oxidizing media or gaseous or liquid corrosive agents at elevated temperatures, coated with a non-glassy coating which improves the resistance of the body to oxidation or corrosion and which may also enhance the body's electrical conductivity and/or its electrochemical activity, in which the protective coating is applied from a colloidal slurry containing particulate reactant or non-reactant substances, or a mixture of particulate reactant and non-reactant substances, said slurry forming said non-glassy protective coating by reaction sintering and/or sintering without reaction when the body is heated to a sufficiently elevated temperature, wherein the non-reactant substances comprise antioxidant or oxidation prevention materials such as boric acid and its salts, and fluorides; bonding enhancing materials such as methylcellulose, particulate alumina or urea; metallic, intermetallic, semi-metallic, polymeric, refractory and/or ceramic materials such as borides, carbides, nitrides, silicides, oxides, oxynitrides and mixtures thereof; pyrolizable chlorosilanes, polycarbosilanes, polysilanes and other organometal polymers which pyrolize to useful products for oxidation prevention or enhancing bonding, or their pyrolized products; thermosetting resins; thermoplastic resins; and mixtures thereof.

45. A coated body according to claim 44, containing metallic particles of Ni, Pt, Al, Cr or intermetallic particles selected from NiAl, $NiAl_3$, CrSi, CrB, or combinations thereof.

46. A body of carbonaceous or other material for use in corrosive environments such as oxidizing media or gaseous or liquid corrosive agents at elevated temperatures, coated with a non-glassy protective surface coating which improves the resistance of the body to oxidation or corrosion and which may also enhance the bodies electrical conductivity and/or its electrochemical activity, in which the protective coating is applied from a colloidal slurry containing particulate non-reactant substances, or a mixture of particulate reactant and nonreactant substances, in which the non-reactant substances are particulates with a particle size below 100 microns, said slurry forming said non-glassy protective coating by sintering without reaction when the body is heated to a sufficiently elevated temperature.

47. A coated body according to claim 44, in which different non-reactant particulate substances have different particle sizes to optimize packing of the particles, with particle size ratios in the range from 2:1 to 5:1.

* * * * *